US009195722B1

(12) United States Patent
Liu et al.

(10) Patent No.: US 9,195,722 B1
(45) Date of Patent: Nov. 24, 2015

(54) PRIVACY-PROTECTED SEARCH

(71) Applicant: GOOGLE INC., Mountain View, CA (US)

(72) Inventors: Jia Liu, Sunnyvale, CA (US); Xincheng Zhang, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 320 days.

(21) Appl. No.: 13/854,836

(22) Filed: Apr. 1, 2013

(51) Int. Cl.
*G06F 17/30* (2006.01)

(52) U.S. Cl.
CPC .... *G06F 17/30554* (2013.01); *G06F 17/30648* (2013.01)

(58) Field of Classification Search
CPC ............... G06F 17/30554; G06F 17/30648
See application file for complete search history.

(56) References Cited

U.S. PATENT DOCUMENTS

| | | | |
|---|---|---|---|
| 2005/0076089 A1* | 4/2005 | Fonseca | 709/206 |
| 2013/0097144 A1* | 4/2013 | Siamwalla et al. | 707/706 |
| 2014/0136617 A1* | 5/2014 | Singer et al. | 709/204 |

* cited by examiner

*Primary Examiner* — Apu Mofiz
*Assistant Examiner* — Jared Bibbee
(74) *Attorney, Agent, or Firm* — Procopio, Cory, Hargreaves & Savitch LLP (57) ABSTRACT

Privacy-protected search is described, including obtaining a set of search results responsive to a search input from a first user; determining, from the search results and based on a social graph, that a first search result associated with a second user is indicated as keeping an identity of the second user hidden; determining whether other search results in the set are indicated as keeping respective identities of associated other users hidden; calculating a score for the first search result based at least on the determinations, the score indicates the likelihood of the first user guessing the identity of the second user; and determining whether to provide to the first user the first search result based on the score for the first search result.

19 Claims, 7 Drawing Sheets

PRIVACY-PROTECTED SEARCH

BACKGROUND

Users search online for various kinds of information, including recommendations to products and services. For recommendations, users tend to give more weight to recommendations from people they know, e.g., the more the users know the recommenders the higher the weight.

On the other hand, some people who provide recommendations may not want to reveal their identities. For example, these people may want to recommend doctors, dentists, lawyers, etc. to their friends and acquaintances but may not want their friends and acquaintances to know that they use these service providers, which include, for example, a doctor specializing in a certain field.

SUMMARY

The subject matter discussed herein relates generally to data processing and, more particularly, to privacy-protected search.

The subject matter described may herein provide various advantages, such as enhancing user experience (e.g., a user does not have to search for a service or product and consult with his or her friends regarding the service or product); allowing users to share their feedback, such as comments and/or recommendations anonymously or openly; and allowing a user to request search results with or without annotation with comments and/or recommendations.

The subject matter includes a method for obtaining a set of search results responsive to a search input from a first user; determining, from the search results and based on a social graph, that a first search result associated with a second user is indicated as keeping an identity of the second user hidden; determining whether other search results in the set are indicated as keeping respective identities of associated other users hidden; calculating a score for the first search result based at least on the determinations, the score indicates the likelihood of the first user guessing the identity of the second user; and determining whether to provide to the first user the first search result based on the score for the first search result.

In some implementations, the calculating the score for the first search result is further based on a hop value provided by the first user.

In some implementations, the search input includes the hop value.

In some implementations, the calculating the score for the first search result is further based on a position with respect to the social graph of a node associated with the second user.

In some implementations, the determining whether to provide to the first user the first search result is further based on another input from the first user.

In some implementations, the method includes providing the first search result to the first user based on the score meeting a threshold value.

In some implementations, the method includes providing the other search results to the first user, wherein the other search results are not indicated as keeping identities associated respectively with the other users hidden.

In some implementations, the first search result and the other search results are provided for presenting in two separate regions of a user interface.

In some implementations, the method includes providing to the first user at least a portion of the set of search results; and based on the score, not providing the first search result to the first user.

In addition to a method as described above, the implementations may include a system or a computer-readable medium, but are not limited thereto.

DETAILED DESCRIPTION

The subject matter described herein is taught by way of example implementations. Various details have been omitted for the sake of clarity and to avoid obscuring the subject matter. The examples shown below are directed to structures and functions for implementing privacy-protected search.

Figure 1:
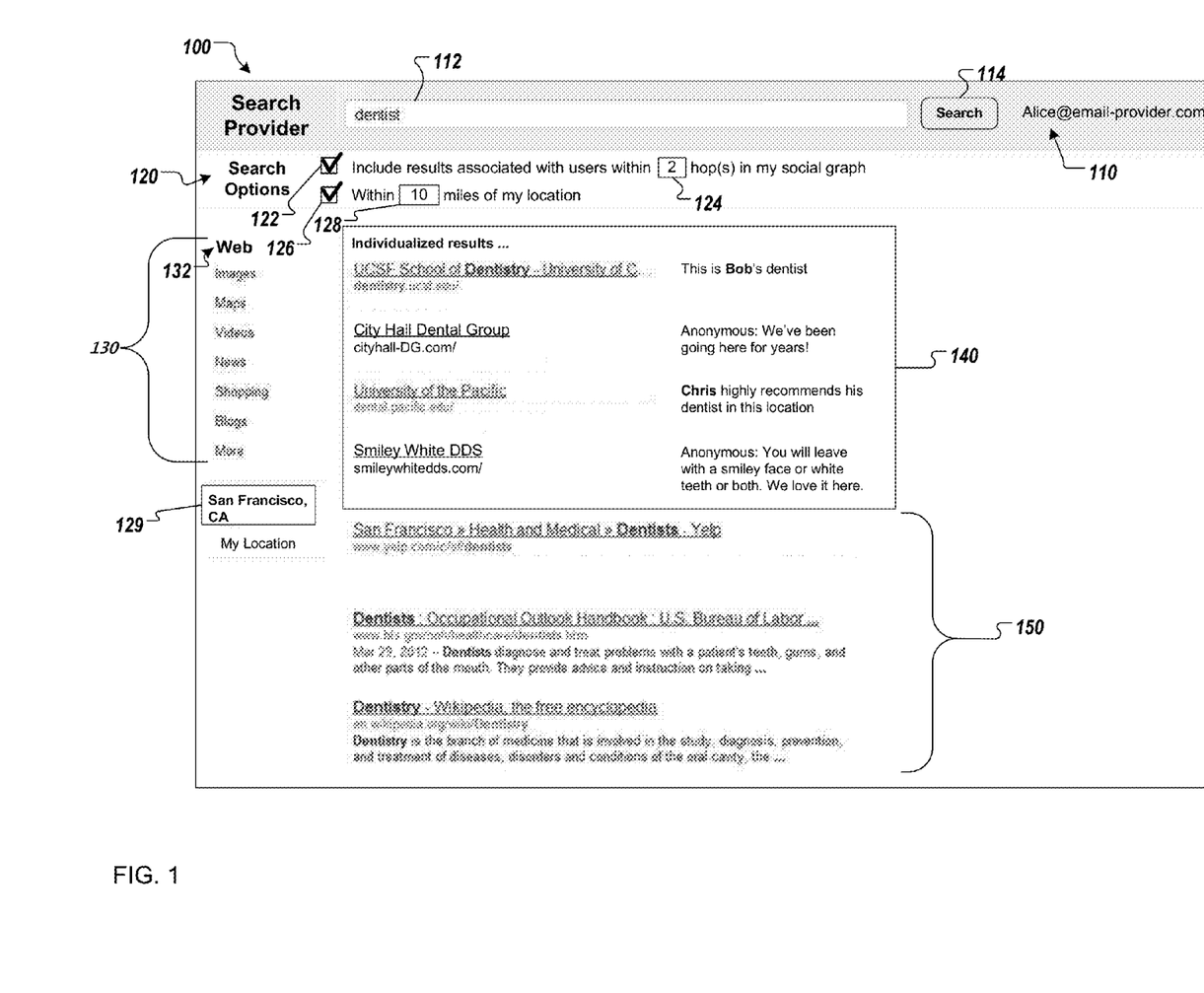
FIG. 1 shows a search interface of some example implementations.

FIG. 1 shows a search interface of some example implementations. Search user interface (UI) 100 shows that the search is requested by a logged in user Alice 110 (e.g., showing Alice's email address) who requests a search with search input "dentist" 112. In some implementations, a search is conducted as soon as search input 112 is entered. In other implementations, Alice may presses (e.g., clicks on) a "Search" button 114 to trigger the search.

Alice may requests searches that include searching data associated with users or people she knows (individualized searches). For example, when Alice wants to find a dentist, she may want to know what dentists her friends and/or acquaintance use or recommend. Alice may indicate an individualized search using one or more search options 120. For example, Alice may activate an individualized search by using checkbox 122 (e.g., a check mark).

In some implementations, individualized searches may be performed or conducted using a social graph (described further in FIG. 2 below). Alice may be provided a mechanism 124 to indicate a portion of her social graph to be used in the search. Here, Alice indicates that two hops of her social graph are to be used in the search. In some implementations, Alice may provide other input or filtering criteria for the search. For example, Alice may activate a criterion using UI element 126 (e.g., checking a checkbox) and enter a value to a field 128 (e.g., search within 10 miles of my location 129).

In some implementations, there may be no checkboxes 122 and 126. Entering a value in input box 124 would activate an individualized search and entering a value in input box 128 would activate that criterion. In some implementations, there may be different, additional, or fewer search options 120. In some implementations, individualized searches can be implemented as default searches, and Alice may deactivate individualized searches by not logging in before requesting a search, by adjusting a setting, or by other manner. In some implementations, search options may be entered along with search input using search input box 112. For example, Alice may enter "dentist recommendations from 2 hops within 10 miles" to input box 112.

Here, as an example, Alice may want to search for "dentist" using data associated with two hops of her social graph. Alice may be interested in dentists within 10 miles from her location and enters "10" in input box 128. Alice's may want to search data associated with the web 132 or another one of data groups 130 (e.g., images, maps, video, news, shopping, blogs, etc.).

The search results, based on the search input 112 and/or one or more search options 120, may be provided for presenting or displaying as search results 140 and 150. Search results 140 are resulted from searching any available data enhanced with searching data associated with Alice's social graph and/or other data associated with her. Search results 140 are described further below in FIG. 3.

Search results 150 are resulted from searching any available data without searching data associated with Alice's social graph. If Alice requests the search without login in or with individualized search disabled, if implemented, Alice would get the same or similar search results 150 with the same "dentist" search input 112 and "San Francisco, Calif." location.

Figure 2A:
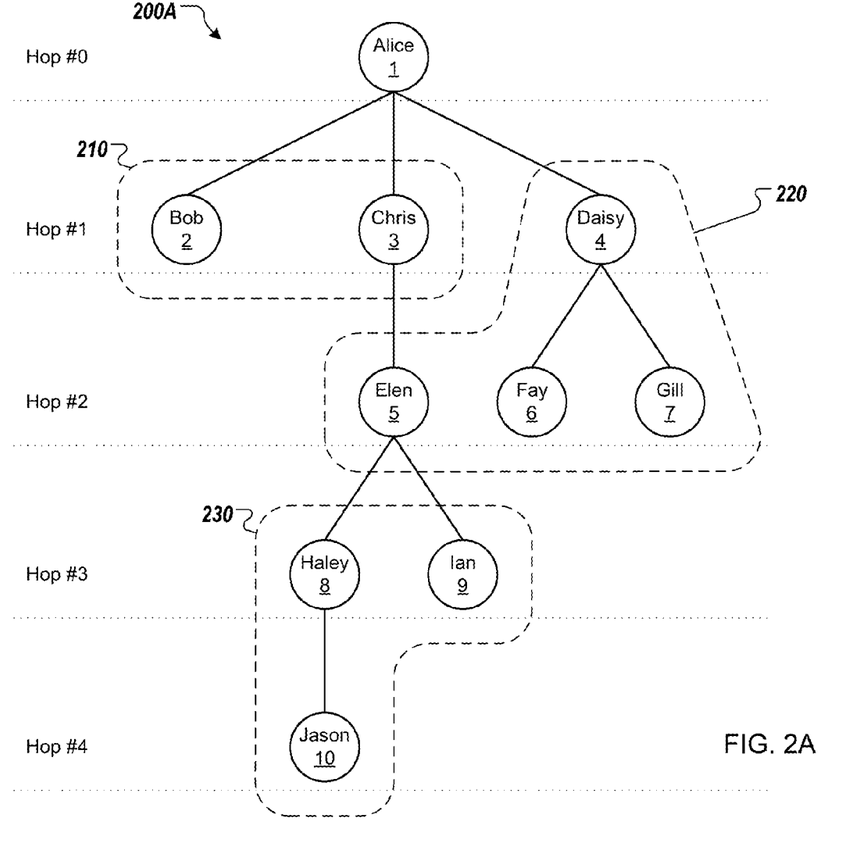
FIG. 2A shows an example social graph.

FIG. 2A shows an example social graph. Social graph 200A may represent Alice's connections with people or users she knows. Alice is represented by node 1 or a root node, which may be considered as hop 0. One hop away (e.g., hop #1) or one degree of separation from Alice are Bob, Chris, and Daisy at nodes 2-4. These may be people or users Alice knows directly. Chris at node 3 may know Elen at node 5. Daisy at node 4 may know Fay and Gill at nodes 6-7. Elen, Fay, and Gill at nodes 5-7 may be considered two hops away from Alice (e.g., hop #2). For example, Alice knows Elen through Chris. At hop #3 is Haley and Ian at nodes 8 and 9. At hop #4 is Jason at node 10.

When Alice wants to search for "dentist", she wants to include data associated with nodes within two hops of her social graph. In effect, Alice has indicated that nodes 2-7 are included and nodes 8-10 are excluded. Social graph 200A shows, as an example, that Bob and Chris are open to sharing their recommendations and/or comments (feedback) about dentists (e.g., Bob and Chris do not indicate that they want to be anonymous with respect to their recommendations and comments about dentists). Bob and Chris at nodes 2-3 are shown in group 210 (the open group). Within two hops of social graph 200A, Daisy, Elen, Fay, and Gill at nodes 4-7 may have indicated that they want to share their recommendations and/or comments about dentists anonymously (e.g., do not show or reveal their identities with their recommendations and/or comments about dentists). Daisy, Elen, Fay, and Gill at nodes 4-7 are shown in group 220 (the anonymous group).

Group 230 (the outside group) includes nodes 8-10 that are outside the two hops Alice is interested in. Regardless of whether Haley, Ian, and/or Jason has shared any recommendations and/or comments about dentists or whether they want to share them anonymously, data associated with these nodes are not included in the search for "dentist" within two hops (or are excluded after the search).

Figure 2B:
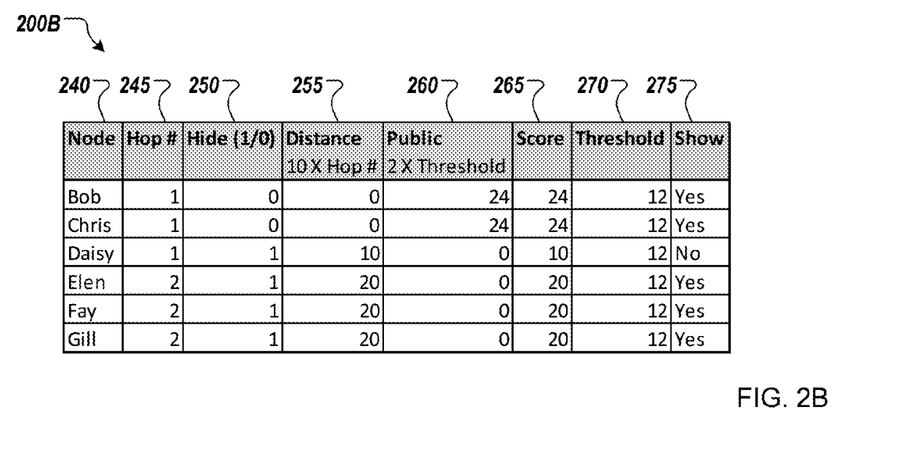
FIG. 2B shows an example score computation.

FIG. 2B shows an example score computation. Table 200B includes the nodes within two hops as indicated by Alice. Each node is shown on a row. Column 240 shows the user name of a node. Column 245 shows the hop number. Column 250 show whether the user prefers to hide (value "1") his or her identity (e.g., being anonymous) or not (value "0"). Column 255, in an example computation, may indicate a distance from Alice. The distance may be, for example, 10 times the hop number. The distance may be computed for the nodes associated with users who want to be anonymous (anonymous nodes, Daisy, Elen, Fay, and Gill). Column 260 may compute a value for the public nodes (e.g., not anonymous nodes, Bob and Chris).

The public nodes are included based on a threshold value. A value in column 260 may be a product of the threshold value and a multiplier of at least one (e.g., two). Column 265, where a score for each node is computed, may be the sum of the distance value (column 255) and public value (column 260). Please note that columns 255 and 260 are mutually exclusive in this example. A score in column 265 that meets (e.g., equal to or greater than) the threshold value (shown in column 270) provides an indication that data associated with the corresponding node can be shown in a search results, which may be subjected to other filtering and/or restrictions, such as within 10 miles of Alice. Column 275 shows that all the nodes except Daisy, which has a score of 10 that is less than the threshold value of 12, the data associated with which can be included in the search for "dentist."

Figure 3:
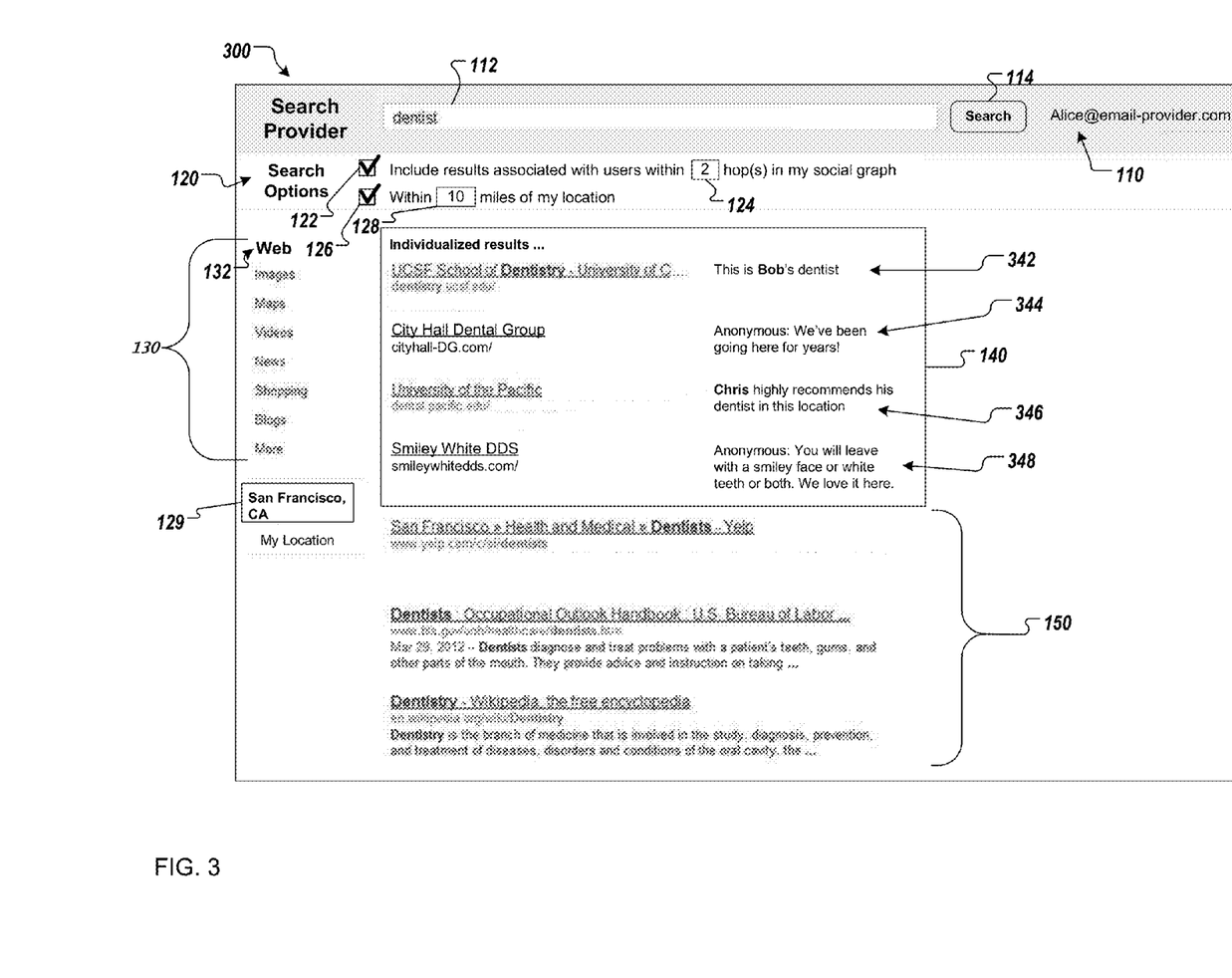
FIG. 3 shows example results based on FIGS. 2A-B.

FIG. 3 shows example individualized results based on FIGS. 2A-B. Table 200B of FIG. 2B indicates that data associated with the nodes of Bob, Chris, Elen, Fay, and Gill may be searched to provide the individualized results 140. Bob's dentist may be a dentist at UCSF School of Dentistry, and Bob may so indicated on a social network (e.g., Bob may provide a feedback or comment, such as "My dentist" associated with the UCSF School of Dentistry). Chris may indicate that he highly recommends his dentist at the University of the Pacific (e.g., on a social network or website where rating is sough from users on the University of the Pacific). Elen, who prefers to be anonymous, may have commented that "We've been going here for years!" in association with City Hall Dental Group. Fay may have commented on a dentist that is more than 10 miles from Alice's location or Fay may not have provided any comment or recommendation about any dentist. Gill may have posted on a social network with the text "You will leave with a smiley face or white teeth or both. We love it here," in association with Smiley White DDS.

Alice's search on "dentist" with a location of "San Francisco, Calif." may yield the results shown in areas 150 as well as UCSF School of Dentistry, City Hall Dental Group, University of the Pacific, and Smiley White DDS. If Alice's search is requested without search her social graph data (e.g., she disables individualized search or requests the search without logging in), all the search results, including UCSF School of Dentistry, City Hall Dental Group, University of the Pacific, and Smiley White DDS would be provided for presenting in results 150.

When individualized search is enabled (e.g., searching data associated with her social graph), Bob's comment associated with the UCSF School of Dentistry is revealed in individualized results 140 alone with an indication (e.g., "This is Bob's dentist" or the like 142). The University of the Pacific is also shown in individualized results 140 due to Chris's recommendation associated with the University of the Pacific 146. Similarly, the City Hall Dental Group and Smiley White DDS are shown in individualized results 140 due to the comments and/or recommendations from Elen and Gill 144 and 148. To honor their wishes to not be identified in the results, Elen's and Gill's recommendations are shown without attribution.

FIG. 2AB and FIG. 3 show one example of computing a score associated with a node. In implementations, the score can be computed in any manner. The score serves at least the purpose of determining and/or selecting a node for inclusion or exclusion. In some implementations, selecting a node for inclusion or exclusion does not involve a score (e.g., a node can be selected based on hop information and/or other information). For example, if the number of nodes in the anonymous group 220, FIG. 2A, is less than a number (e.g., two or three), all nodes in group 220 are excluded. If data from one or two anonymous nodes are include in the search results, it may be easier for Alice to guess which user provides the anonymous recommendations. For example, if Alice searches "dentist" and indicates including searching one hop of her social graph, which includes Bob, Chris, and Daisy, with Daisy being the only anonymous node. It would be easy for Alice to guess that Daisy provides the only anonymous recommendations in the individualized search results 140, which would defeat Daisy's wish to remain anonymous.

Figure 4A:
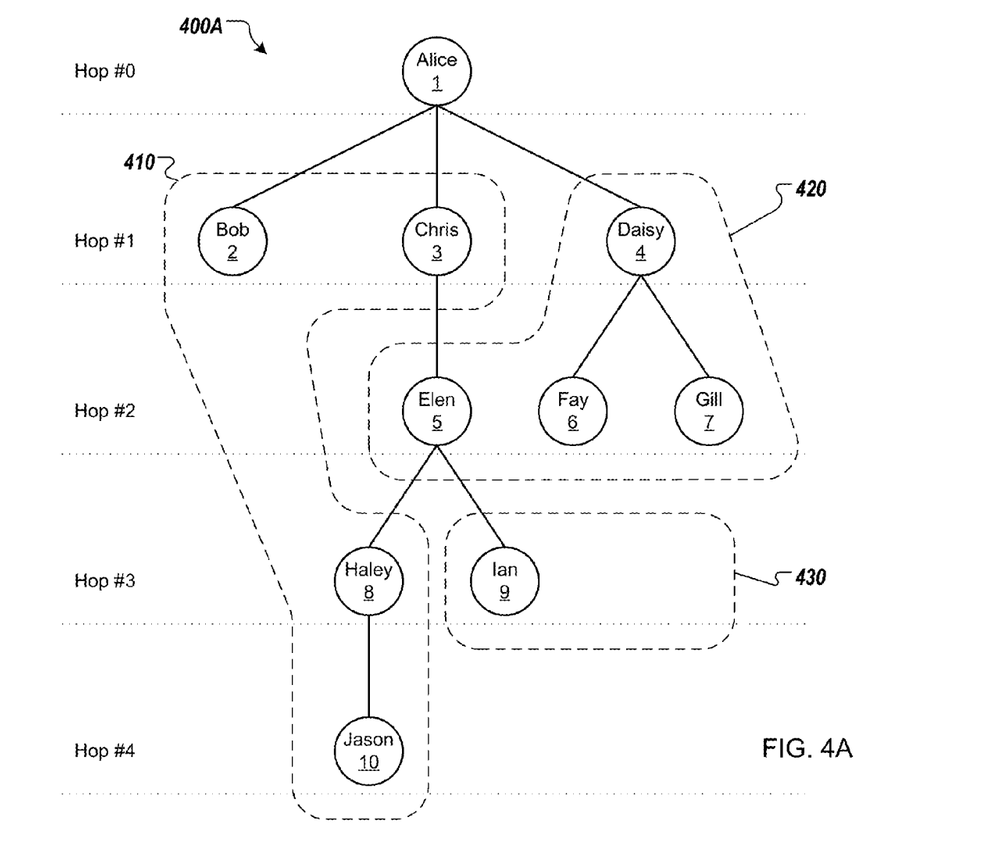
FIG. 4A shows another example of identifying nodes of a social graph.

FIG. 4A shows another example of identifying nodes of a social graph. Same as above, Alice wants to search for "dentist" and search data associated with two hops of her social graph. In this example of FIG. 4A, the two hops may be applied to nodes for the users who do not wish to have attribution for their content. Group 410 shows the open nodes (e.g., in addition to Bob and Chris, Haley and Jason want to openly share their comments and/or recommendations about dentists). Group 420, same as group 220 above, shows the non-attribution user nodes. Group 430 shows that Ian at node 9 is the only node excluded by the two hops input (e.g., Ian either does not share any comments and/or recommendation about dentist or want the share them anonymously).

Figure 4B:
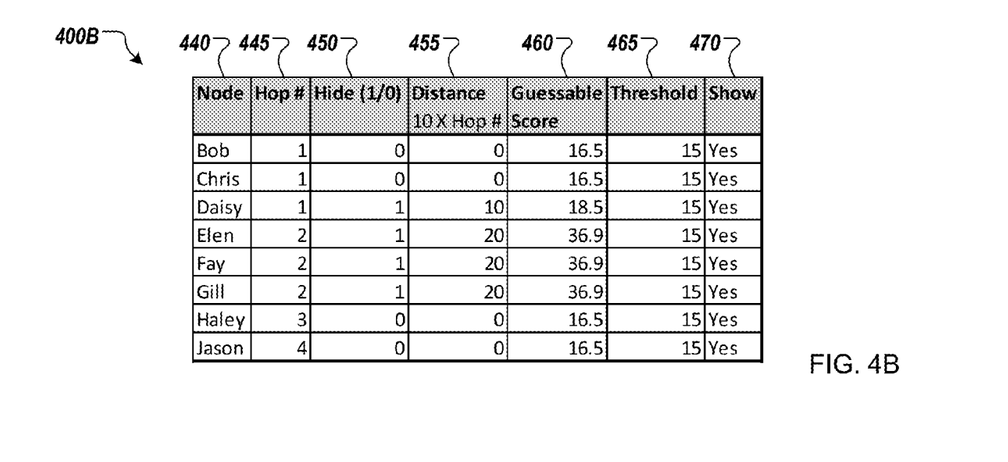
FIG. 4B shows another example score computation.

FIG. 4B shows another example score computation. Columns 440-455 and 465-670 are the same as columns 240-255 and 270-275, FIG. 2B, respectively. The different example of score computation is shown in column 460 where a guessable score is computed. The lower the value of the guessable score, the easier for Alice to guess the identity behind an unattributed comment and/or recommendations. An example threshold value, column 465, is set at 15. The threshold value can be set and/or adjusted to any value based on implementation and/or other factors.

For open nodes (e.g., nodes in group 410), the guessable score may be set to any value equal to or above the cut-off value (e.g., threshold 460). Here these nodes have a guessable score of 1.1 times the threshold value (or 1.1×15=16.5).

For the anonymous nodes (e.g., nodes in group 420), the total number of anonymous nodes may be determine (e.g., T=4). The sum of the distance of these nodes may be computed (e.g., Sum=70). The guessable score (GS) may be computed using formula 1.0 below.

$$GS=Distance \times \log(Sum) \quad (1.0)$$

For example, since log (70)=1.845, GS for Daisy, node 4, would be 10×1.845=18.45. And GS for Elen, Fay, and Gill would 20×1.845=36.90. GS grows when Distance and/or T grows (e.g., harder to guess the anonymous identify).

Since all the nodes in table 400B have a GS above the threshold of 15, column 470, data for all the nodes may be included if relevant to the search input of "dentist."

In another example of node selection, instead of looking at the GS of each node, a collective value (e.g., maximum, average, or minimum) of all the GS values may be used. For example, if T is at least 2 and if the collective value meets a threshold (e.g., 13), select all the anonymous nodes.

The above are only examples, and are not intended to be limiting, of search input, search options, and selection of nodes. The described examples, e.g., for node selection, may be combined and/or alter to suit implementations and/or data set. One skilled in the art would and could implement the search options, selection of nodes, and/or other aspects differently.

Figure 5:
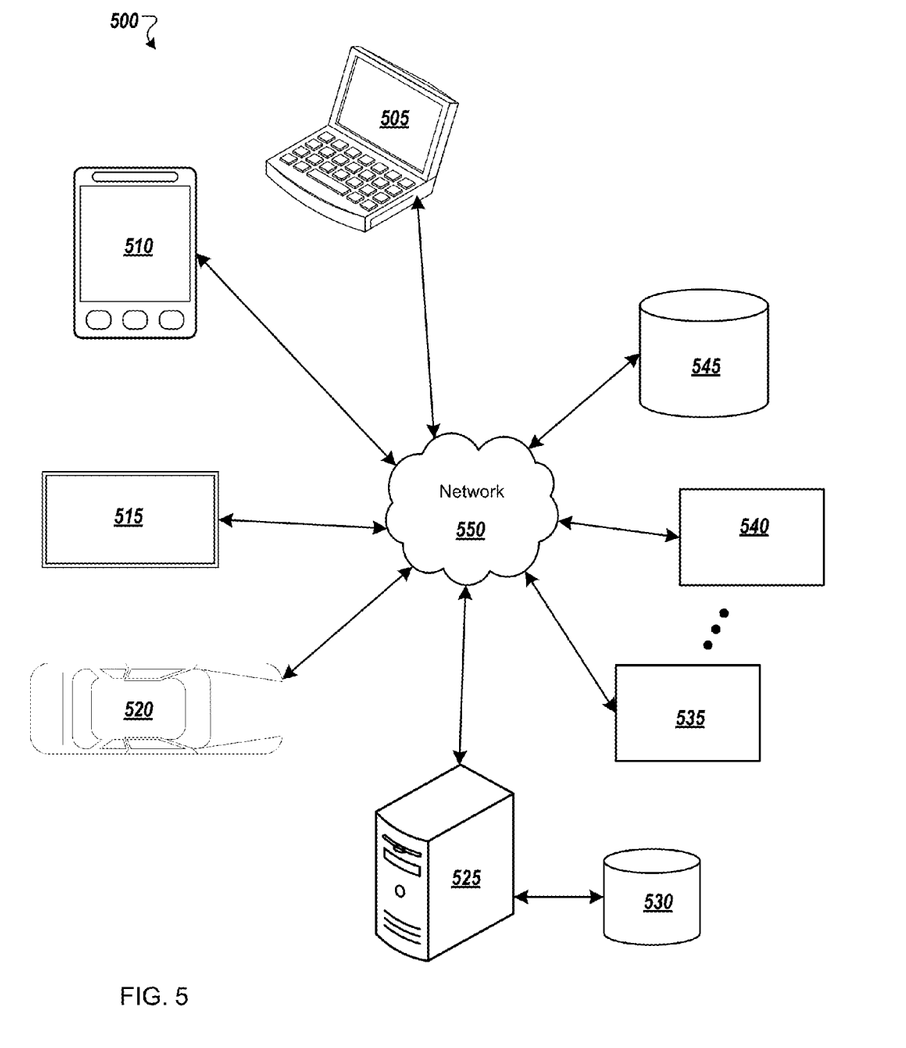

FIG. 5 shows an example environment suitable for some example implementations. Environment 500 includes devices 505-545, and each is communicatively connected to at least one other device via, for example, network 550 (e.g., by wired and/or wireless connections). Some devices may be communicatively connected to one or more storage devices 530 and 545.

An example, one or more devices 505-545 may be computing device 705 described below in FIG. 7. Devices 505-545 may include, but are not limited to, a computer 505 (e.g., a laptop computing device), a mobile device 510 (e.g., smartphone or tablet), a television 515 with one or more processors embedded therein and/or coupled thereto, a device associated with a vehicle 520, one or more server computers 525, computing devices 535-540, storage devices 530, and 545.

In some implementations, devices 505-520 may be considered user devices (e.g., devices used by Alice to access services and/or issue requests, such as search request). Devices 525-545 may be devices associated with one or more service providers (e.g., used by service providers to provide social network services and/or search services and/or store data, such as webpages, text, text portions, images, image portions, audios, audio segments, videos, video segments, and/or information thereabout).

Figure 6:
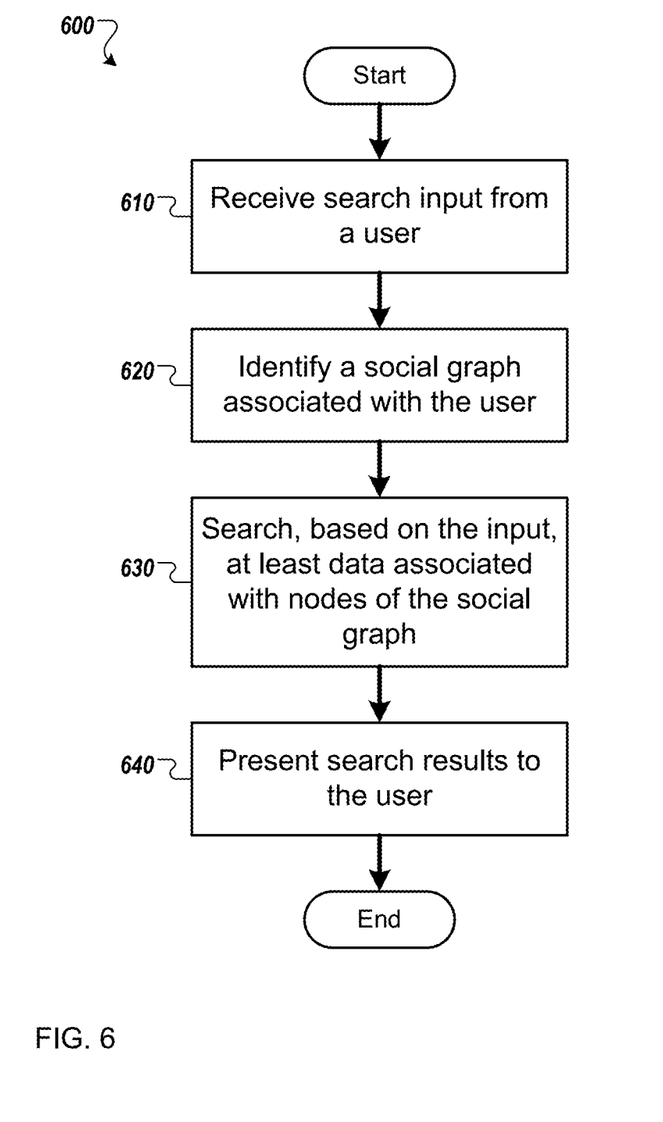
FIG. 6 shows an example of a process implementation.

FIG. 6 shows an example of a process implementation. Process 600 may begin with receiving search input from a user at block 610. For example, a user (e.g., Alice) may enter search input (e.g., "auto mechanics") to an input box. Before the user enters a search input, a user interface that includes the search input box may be provided (e.g., by a search engine, server, or system of a search provider) for presenting to the user on a user device, from which the user accesses the search services.

At block 620, data associated with the user may be used in the search (e.g., to annotate or the search results). For example, a social graph associated with the user may be identified and/or generated (e.g., from the user's social network account, email account, and/or another source where contact information associated with the user may be available). The user has a choice or option to request a search without using data associated with the user (e.g., disabling such option where implemented or requests the search without login in).

At block 630, one or more computing devices associated with the search service provider perform the requested search based on the input (e.g., obtaining a set of search results responsive to a search input from a user). If the user is logged in and/or has permitted use of data associated with the user, such data may be searched. Data may be associated with one or more nodes of a social graph associated with the user. The nodes may be selected for inclusion or exclusion based on one or more input and/or factors.

For example, Alice may indicate, as a search option, that N number of hops of her social graph data may be searched. Search result associated with a node of the social graph may be determined to identify whether the node is an anonymous node (e.g., a user associated with the node includes an indications to keep the user's identity hidden). Search results associated with other nodes may be determined to identify whether any of these nodes are anonymous nodes and/or open nodes. Each node may be selected using, for example, a score (e.g., calculated based on one or more determinations) that meets or exceeds a threshold value.

The search results, portion of the search results, and/or data associated with one or more nodes may be determined whether to provide to Alice based on the one or more scores of the nodes. At block 640, the search results annotated with data from the user's social graph are presented to the user.

In some examples, process 600 may be implemented with different, fewer, or more blocks. Process 600 may be implemented as computer executable instructions, which can be stored on a medium, loaded onto one or more processors of one or more computing devices, and executed as a computer-implemented method.

Figure 7:
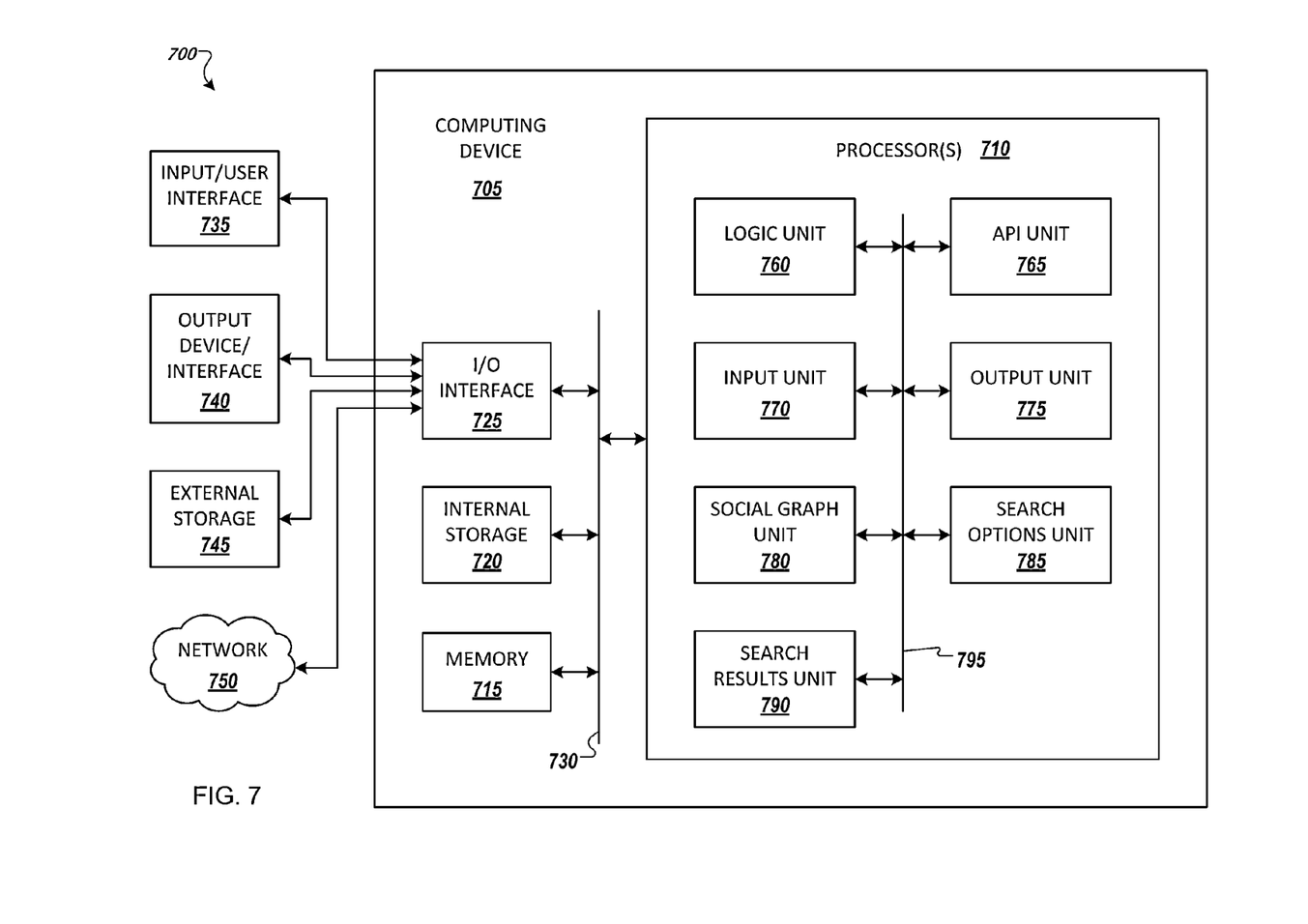
FIG. 7 shows an example computing environment with an example computing device suitable for use in some example implementations.

FIG. 7 shows an example computing environment with an example computing device suitable for use in some example implementations. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705.

Computing device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computing device 705. In other example implementations, other computing devices may function as or provide the functions of input/user interface 735 and output device/interface 740 for a computing device 705.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, social graph unit 780, search options unit 785, search results unit 790, and inter-unit communication mechanism 795 for the different units to communicate with each other, with the OS, and with other applications (not shown). For example, social graph unit 780, search options unit 785, and search results unit 790 may implement one or more processes shown in FIGS. 2AB, 4AB, and 6. The described units and elements can be varied in design, function, configuration, or implementation and are not limited to the descriptions provided.

In some example implementations, when information or an execution instruction is received by API unit 765, it may be communicated to one or more other units (e.g., logic unit 760, input unit 770, output unit 775, social graph unit 780, search options unit 785, and search results unit 790). When Alice search for "dentist" with hops=2 and within 10 miles of her location, her search input and search options may be received by input unit 770, which may pass to logic unit 760 for processing. Social graph unit 780 may be interfaced via API unit 765 to identify and/or generate a social graph associated with Alice and select nodes within two hops of the graph (e.g., select anonymous nodes and/or open nodes). Search options unit 785 may be interfaced via API unit 765 to process the "within 10 miles" input before or after search results have been produced. Search results unit 790 may be interfaced via API unit 765 to filter, annotate, and/or provide the search results.

In some instances, logic unit 760 may be configured to control the information flow among the units and direct the services provided by API unit 765, input unit 770, output unit 775, social graph unit 780, search options unit 785, and search results unit 790 in some example implementations described above. For example, the flow of one or more processes or implementations may be controlled by logic unit 760 alone or in conjunction with API unit 765.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined.

Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
   receiving input from a first user indicating the first user permits sharing of feedback that comprises feedback data from the first user but does not permit sharing the first user's identity;
   obtaining a set of search results responsive to a search input from another user, the search results comprise the feedback data;
   calculating a score for the feedback data based a social graph that covers the first user and the another user, the score indicating the likelihood of the another user guessing the identity of the first user, wherein the social graph is identified or generated based on a source having contact information associated with the first user; and
   determining, based at least on the score, whether to provide the feedback data to the another user, wherein for the another user not permitting sharing of its identity, the score is based on a product of a number of users not permitting sharing their identities and a sum of distances between each of the users not permitting sharing of their identities, the users being on the social graph which includes the another user, and for the another user permitting sharing its identities, the likelihood is based on a multiple of a threshold value.

2. The method of claim 1, wherein the feedback is related to the search input from the another user.

3. The method of claim 1, wherein the obtaining the set of search results comprising searching at least feedback data from users on the social graph that includes the first user and the another user.

4. A computer-implemented method, comprising:
   obtaining a set of search results responsive to a search input from a first user;
   determining, from the search results and based on a social graph, that a first search result associated with a second user is indicated as keeping an identity of the second user hidden, wherein the social graph is identified or generated based on a source having contact information associated with the first user;
   determining whether other search results in the set are indicated as keeping respective identities of associated other users hidden;
   calculating a score for the first search result based at least on the determinations, the score indicating the likelihood of the first user guessing the identity of the second user; and
   determining, based at least on the score, whether to provide the first search result to the first user, wherein for the associated other users keeping the respective identities hidden, the score is based on a product of a number of the associated other users keeping the respective identities hidden and a sum of distances between each of the associated other users keeping the respective identities hidden, the associated users being on the social graph, and for the associated other users permitting sharing their identities, the likelihood is based on a multiple of a threshold value.

5. The method of claim 4, wherein the calculating the score for the first search result is further based on a hop value provided by the first user.

6. The method of claim 5, wherein the search input comprises the hop value.

7. The method of claim 4, wherein the calculating the score for the first search result is further based on a position with respect to the social graph of a node associated with the second user.

8. The method of claim 4, wherein the determining whether to provide to the first user the first search result is further based on another input from the first user.

9. The method of claim 4, further comprising providing the first search result to the first user based on the score meeting a threshold value.

10. The method of claim 9, further comprising providing the other search results to the first user, wherein the other search results are not indicated as keeping identities associated respectively with the other users hidden.

11. The method of claim 10, wherein the first search result and the other search results are provided for presenting in two separate regions of a user interface.

12. At least one computing device comprising storage and a processor configured to perform:
   obtaining a set of search results responsive to a search input from a first user;
   determining, from the search results and based on a social graph, that a first search result associated with a second user is indicated as keeping an identity of the second user hidden, wherein the social graph is identified or generated based on a source having contact information associated with the first user;
   determining whether other search results in the set are indicated as keeping respective identities of associated other users hidden;
   calculating a score for the first search result based at least on the determinations, the score indicating the likelihood of the first user guessing the identity of the second user; and
   determining, based at least on the score, whether to provide the first search result to the first user, wherein for the associated other users keeping the respective identities hidden, the score is based on a product of a number of the associated other users keeping the respective identities hidden and a sum of distances between each of the associated other users keeping the respective identities hidden, the associated users being on the social graph, and for the associated other users permitting sharing their identities, the likelihood is based on a multiple of a threshold value.

13. The at least one computing device of claim 12, wherein the calculating the score for the first search result is further based on a hop value provided by the first user.

14. The at least one computing device of claim 13, wherein the search input comprises the hop value.

15. The at least one computing device of claim 12, wherein the calculating the score for the first search result is further based on a position with respect to the social graph of a node associated with the second user.

16. The at least one computing device of claim 12, wherein the determining whether to provide to the first user the first search result is further based on another input from the first user.

17. The at least one computing device of claim 12, further comprising providing the first search result to the first user based on the score meeting a threshold value.

18. The at least one computing device of claim 17, further comprising providing the other search results to the first user, wherein the other search results are not indicated as keeping identities associated respectively with the other users hidden.

19. The at least one computing device of claim 12, further comprising:
   providing to the first user at least a portion of the set of search results; and
   based on the score, not providing the first search result to the first user.

\* \* \* \* \*